United States Patent Office 3,649,630
Patented Mar. 14, 1972

3,649,630
HOMATROPINE DIPROPYLACETATE
Henry E. Meunier, Grenoble, Isere, and Pierre L. Eymard, Fontaine, Isere, France, assignors to Laboratoires J. Berthier S.A., Grenoble, France
No Drawing. Filed Feb. 27, 1970, Ser. No. 15,264
Claims priority, application France, Mar. 4, 1969, 6905809; Mar. 5, 1969, 6906045
Int. Cl. C07d 43/06
U.S. Cl. 260—292    1 Claim

ABSTRACT OF THE DISCLOSURE

As a new medicament, particularly useful as an antispasmodic and antiulcer agent, di-n-propylacetylated derivative of homatropine having a molecular weight of 401.33 and a melting point from about 137° to 140° C.

GENERAL DESCRIPTION OF THE INVENTION

This invention relates to a new medicament, particularly useful as an antispasmodic and antiucler agent, dipropylacetylhomatropine.

This is a di-n-propylacetylated derivative of homatropine having the following formula:

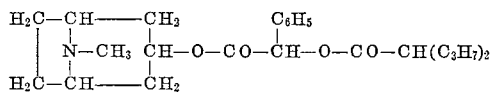

Its molecular weight is of 401.33 and its melting point is from 137° to 140° C.

It is also identifiable by its synthesis which comprises reacting homatropine in acetone with dipropylacetyl chloride, filtering the solution, concentrating the filtrate under vacuum to obtain an oil which is crystallized in petroleum ether and dried.

The following are the pharmacological properties of di-n-propylacetylhomatropine, designating it, for more facility, by its code name B.5167.

The tests made for determining toxicity and activity have been carried out by comparing the B.5167 to several known and used antispasmodic agents: atropine sulphate, homatropine methobromide (Novatropine), homatropine base and n-butylscopolamine bromide (Buscopan).

ACUTE TOXICITY (a) Subcutaneous (s.c.)

The products were given subcutaneously to the mouse, in aqueous solution, except for homatropine base which, being insoluble in the water at these concentrations, was injected in an oily solution.

The $DL_{50}$ values have been calculated by the method of Karber and Behrens, mortality having occured 48 hours after the products were given.

Under these conditions we have obtained the following figures:

| | Mg./kg. |
|---|---|
| B.5167 | 1000 |
| Atropine sulfate | 1330 |
| Novatropine | 130 |
| Homatropine | 1800 |
| Buscopan | 420 |

(b) Intraperitoneal

We have compared the toxicity of B.5167 and basic homatropine.

The products were given intraperitoneally, in aqueous solution.

Under the same conditions as in the preceding test, we have obtained the following results:

| | Mg./kg. |
|---|---|
| B.5167 | 102 |
| Homatropine | 370 |

(c) Orally

As in the preceding test, the products have been given in aqueous solution.

The obtained results are as follows:

| | Mg./kg. |
|---|---|
| B.5167 | 1100 |
| Homatropine | 1307 |

EVALUATION OF ANTIULCER ACTIVITY (a) Protection against the restraint ulcer caused by retention Male or female rats are immobilized during 20 hours by means of the following device. Each animal after a light anesthesia with ether (the rat is introduced into a bottle in the shape of a pitcher containing a pad soaked with ether) is placed in a rectangle made of flexible metallic grate in which four holes have been made bordered by a rubber washer. These openings are destined for the passing of each one of the fore and hind legs.

These latter are kept in place by downward traction by one of the manipulators, while the grate is closed around the body of the animal in such a manner that once the closing consolidated by the winding of adhesive plaster around the grate, the body of the animal cannot move. When this operation is completed, the legs are in turn tightly maintained in place by a thick ring of leucoplast binding them two by two and preventing them from coming out through the inlet opening.

Around of each cylinder constituted by the grate wrapping the animal are passed two metallic rings with a hook at the end to permit the suspension of the set. The suspension apparatus is constituted by a support on which are fixed some rods directed perpendicularly to the support, on which rods is hooked the previously described system.

The animals are thus kept during 20 hours and sacrificed by gas at the end of the experiment. The stomach is removed, opened along the small curvature, cleared from foods and carefully examined with a magnifying glass before and after washing.

One observes the coloring of the gastric mucous membrane, the existence of hemorrhagic points and ulcers.

In the check rats which have not received any therapeutical treatment, one finds in all the cases a strongly hemorrhagic mucous membrane with the presence of several ulcers.

To evaluate the eventual antiucler action of a given product, this latter is given to the animals immediately before the putting into application, while the rats are still drowsy after the ether anesthesia. After a 20-hour application, the stomachs are examined and the results are expressed with the following standards:

- 0: normal stomach
- 1: hemorrhagic spots without ulcer
- 2: ulcer
- 3: several ulcers
- 4: perforation (b) Protection against the restraint ulcer with electricity Male or female rats are placed individually in a glass enclosure the floor of which is constituted of copper bars about 1.5 cm. apart. These bars are connected to an electric source (220-volt alternate current) in such a manner that every other bar is connected in the same phase.

A rat placed in this apparatus must, in order to avoid receiving the current, find the position in which all the parts of its body (tail, legs) are in contact only with homologous bars and keep that position, which limits it to an almost total immobility.

A neon bulb lights up when the animal establishes the contact, enabling one to know in an accurate manner at which time it receives the current and to observe its behavior. Furthermore, this lamp, having its own resistance, absorbs a part of the current and in these conditions the animal is only subject to about 40 volts (control made with an oscilloscope). The rats are left for 24 hours in the apparatus. The control rats receive nothing and the treated animals receive the tested product by the chosen route prior to being put in the restrain state (here the anesthesia is optional).

At the end of the experiment the animals are sacrificed and the stomach examined in the same conditions as for the restrain ulcer by application.

Control rats.—The alterations of the mucous membrane in the type of inflammation or hemorrhage are constant, but there is not always an ulcer, because the experimental conditions are less severe. The standards are the same as given previously.

Results.—The results are shown in the hereunder mentioned Table I.

TABLE I

| Product | Dose in mg./kg., s.c. | Number of animals | | Average made on the determined results according to the above-described standards | |
|---|---|---|---|---|---|
| | | Retention | Electricity | Retention | Electricity |
| Controls | 0 | 10 | 10 | 3 | 2.8 |
| B.5167 | 5 | 10 | 5 | 1.1 | 1 |
| Atropine sulfate | 5 | 10 | 5 | 1 | 0.9 |
| Novatropine | 5 | 10 | 5 | 1.9 | 1.1 |
| Homatropine | 5 | 10 | 5 | 2 | 1.8 |
| Buscopan | 5 | 10 | 5 | 2.7 | 2.6 |

MEASURE OF THE ANTISPASMODIC ACTIVITY

These tests were made on rabbit's isolated intestine sections, according to the usual Magnus method. The apparatus volume was 80 ml., Tyrode's solution being maintained at 37° and at pH 7.2.

(a) Action on the normal intestine

At concentration of 1 mg. per 80 ml. B.5167 causes a rapid fall of tonus accompanied by a total stop of contractions. At the same concentrations, atropine sulfate causes a diminution of the amplitude of the contractions accompanied by a slight drop of tonus, whereas Novatropine, homatropine and the Buscopan are inactive.

(b) Action on the spasm with acetylcholine

The intestine is under spasm by administration of 1 mg. of acetylcholine; this spasm is counteracted with 0.1 mg. of B.5167, this product being the only one for which the drop of tonus is accompanied by the total stop of the contractions. The following dosages are effective in counteracting spasms:

0.2 mg. of atropine sulfate
0.6 mg. of Novatropine
1 m. of homatropine
2 mg. of Buscopan

(c) Action of barium chloride spasms

The intestine being under spasm by the addition of 5 mg. of BaCl$_2$; this spasm is counteracted with return to normal of the tonus and of the contractions with the help of:

0.5 mg. of B.5167
0.8 mg. of atropine sulfate
1 mg. of Novatropine
2 mg. of homatropine
1 mg. of Buscopan

SECONDARY ACTIONS

(a) Mydriatic action

One of the principal disadvantages of the antispasmodic agents derived from atropine being their mydriatic activity, we have studied the activity of B.5167 with equimolecular doses of the tropic acid ester of tropanol by comparing:

1 mg./kg. of B.5167 at 1.50 mg./kg. of atropine sulfate
2 mg./kg. of B.5167 at 1.60 mg./kg. of homatropine hydrochloride This experiment was carried out with the rat, by injecting the products s.c. in aqueous solution.

Mydriasis has been noted in the following manner:

0: normal pupil
2: pupil dilated twice normal
3: pupil dilated three times normal
4: pupil dilated four times normal
5: maximal dilation Five rats at a time were used. The results are entered in Table II.

TABLE II

| | Time of examination (hours) | | | | | | |
|---|---|---|---|---|---|---|---|
| | ½ | 1 | 2 | 3 | 5 | 6 | 7 |
| Atropine sulfate, 1.50 mg./kg. | 5 | 5 | 5 | 5 | 3.4 | 1.6 | 0.8 |
| Homatropine hydrochloride, 1.60 mg./kg. | 3 | 3 | 1.6 | 0.8 | 0 | | |
| B.5167, 1 mg./kg. | 1.2 | 1.2 | 0.4 | 0 | | | |
| B.5167, 2 mg./kg. | 1.6 | 1.2 | 0.4 | 0.4 | 0 | | |

The figures shown in the columns under time indication express the mydriasis average on five animals, according to the standards defined above.

B.5167 clearly appears to be less mydriatic than the other derivatives of tropanol.

(b) Effect on secretions

It is known that atropine and its derivatives diminish, then stop for a quite prolonged duration, even at small dosage, the secretions of the submaxillary gland and of the sublingual gland.

One can thus compare, with the dog, after catheterism of the salivary canals, the action of B.5167 and of the homatropine, by excitation of the salivary secretion either by electric excitation of the cord of the tympanum, or by intravenous injection of pilocarpine.

Tests were made on three male dogs of 10 kg. weight, after anesthesia with Nesdonal by intravenous injection (30 mg./kg. of a solution of 50 mg./ml.).

After dissection of the submaxillary cervical region, the two Wharton's canals are catheterized and the two parotidian canals are ligated (Schneyer's technique).

The secretion is brought about either by electric excitation of the cord of tympanum or by intravenous injection of pilocarpine (1 mg./kg.).

The output is measured at various times after the injection of pilocarpine.

AVERAGE OF THE RESULTS

With B.5167 (2.2 mg./kg. by intravenous injection), the output is diminished by 50% in relation to the output obtained with the same dose of pilocarpine, measured at the same time. Thirty minutes later, a new injection of pilocarpine gives an almost normal secretion.

With homatropine (1.5 mg./kg., equimolar dose), there is almost a complete stop of the secretion, the output is diminished by 90% and in spite of a new injection of pilocarpine thirty minutes later, the secretion remains extremely low.

It is thus affirmed that the B.5167 is less drying than homatropine and that its action on the secretions is of a much shorter duration. In conclusion, B.5167 is a particularly interesting compound. It has an antispasmodic and antiulcer activity substantially equal to that of atropine sulfate which is the most active, experimentally, of the products of this category; its acute toxicity places it in the range of the other esters of tropanol. Taking its activity into account, the therapeutic effect seems particularly good; with effective doses, among the esters of tropanol, it is the compound which has the least mydriatic action and antisecretory action.

The following are two exampes of therapeutical application of the medicament of this invention:

(a) A 35-year old man suffering violent pains, more particular after each meal, because of a duodenal ulcer: The administration, in the morning, of a suppository containing 5 mg. of dipropylacetylhomatropine rapidly stopped the pain and the effect lasted for the whole day;

(b) A 28-year old woman suffering from chronic hepatic pains because of a lithiasis of the biliary ducts: The administration, at the time when the pains start, of a suppository containing 5 mg. of dipropylacetylhomatropine permitted the rapid sedation of this latter.

The invention concerns also a preparation process for homatropine dipropylacetate. This process comprises reacting homatropine with dipropylacetyl chloride, preferably in cold acetone or other inert solvent. The product is isolated by filtration, concentration of the filtrate under vacuum to obtain an oil, crystallizing said oil in a hydrocarbon such as petroleum ether and then separating and drying the crystalline product. The following is a specific example of preparation of the new compound of the invention.

EXAMPLE 1

To a solution of 0.1 mole of homatropine in cold (0–10° C.) acetone is added 0.1 mole of dipropylacetyl chloride. The solution is left at 0–10° C. overnight. Then one isolates the product by filtration to remove the precipitate of homatropine chloride which has formed (0.045 mole) and same is retained to be recovered as homatropine.

One then concentrates the filtrate under vacuum, obtaining an oil. The oil is crystallized in petroleum ether and dried. There is produced 0.0486 mole (48% of the theoretical amount) of homatropine di-n-propylacetate.

We claim:

1. A homatropine derivative having the following structure:

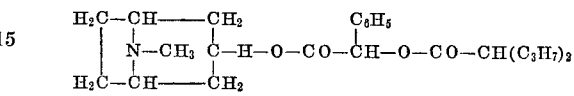

References Cited

Burger, Medicinal Chemistry, Second Edition, Interscience Publishers, pp. 463–469 (1960).

ALAN L. ROTMAN, Primary Examiner

U.S. Cl. X.R.

424—265